Feb. 11, 1964   M. S. SHIMOOKA   3,120,854
AUTOMATIC FLUID PRESSURE EQUALIZING ASSEMBLY
Filed May 6, 1963   3 Sheets-Sheet 1

INVENTOR.
Mike S. Shimooka

INVENTOR.
Mike S. Shimooka
BY

INVENTOR.
Mike S. Shimooka
BY

United States Patent Office 3,120,854
Patented Feb. 11, 1964

3,120,854
AUTOMATIC FLUID PRESSURE EQUALIZING
ASSEMBLY
Mike S. Shimooka, 11673 Arminta St.,
North Hollywood, Calif.
Filed May 6, 1963, Ser. No. 278,334
1 Claim. (Cl. 137—98)

This invention relates to a fluid pressure equalizing assembly. More specifically it can be called a pressure comparing automatic ratio flow regulator.

In most homes and, in particular, multiple unit dwellings there is a problem when taking a shower in that frequently it is necessary to readjust the hot and cold water valves due to a sudden change of pressure in one or both water lines. Provided that the input water temperature is constant, by the dwelling having an adequate water heater, the shower water temperature change is caused by usage at other outlets.

It is an important object of this invention to provide a novel device for equalizing the pressure of a liquid or a gas at the inlets to a system of valves.

It is another object of this invention to provide a novel device of the above described type that will regulate the temperature of a liquid or a gas when used with a system of valves.

More specifically it is an object of this invention to provide a novel device of the above described type that will regulate the temperature of the outlet water when it is used in conjunction with a shower fixture.

A further object of this invention is to provide a novel device of the above described type that accomplishes the following:

(1) It will maintain a constant temperature of a liquid whether the pressure at its inlets change in an increase or decrease direction, whether this change is happening in one or both water lines simultaneously, whether this change is fast or slow, or whether the duration of this change is long or short.

(2) It will not impede the flow of water in either lines should the maximum flow rate from one or both of its outlets be desired.

(3) It will operate in any locality regardless of the difference in the local water pressure or the magnitude of the water pressure.

(4) It will operate over any temperature range within the temperature extremes of the source.

A further object of this invention is to provide a novel device of the above described type that has the following advantages:

(1) It is inexpensive and very simple in construction.
(2) It is very reliable having only one moving part.
(3) It requires no pressure or temperature preset adjustment means.
(4) It is for all practical purpose maintenance free.

Still another object of this invention is to provide an automatic pressure equalizing device that contains within itself a means of cleaning itself.

With these and other objects and advantages in view, the invention consists of the new and novel combination, construction, and arrangement of parts as hereinafter more fully described, set forth in the claim appended hereto, and disclosed in the accompanying drawings forming part hereof, wherein:

Figure 1:
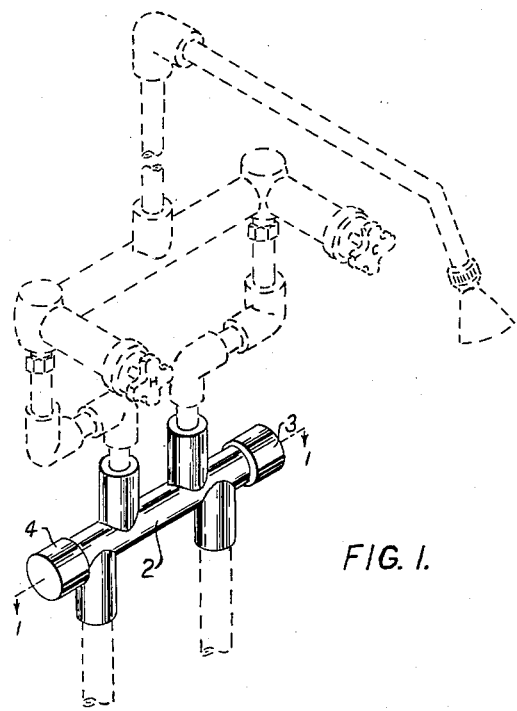
FIGURE 1 is a perspective view of the assembly embodied in a shower fixture to illustrate the method of use as to be described.

FIGURES 3 to 8, inclusive, are sectional views of the assembly taken in the plane indicated by 1—1 in FIGURE 1 showing the various positions of the sectional piston.

Figure 9:
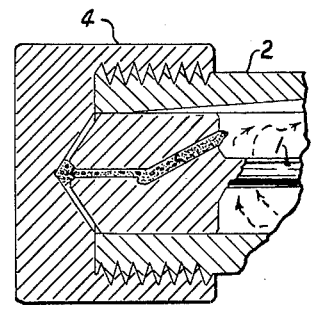

FIGURE 9 is a fragmentary sectional view taken in the plane indicated by 1—1 in FIGURE 1.

While this invention has numerous other applications it will be described as when used in conjunction with a shower fixture as illustrated in FIGURE 1 with the outlets vertically above the inlets and with the hot water valve on the left and cold water valve on the right.

Figure 2:
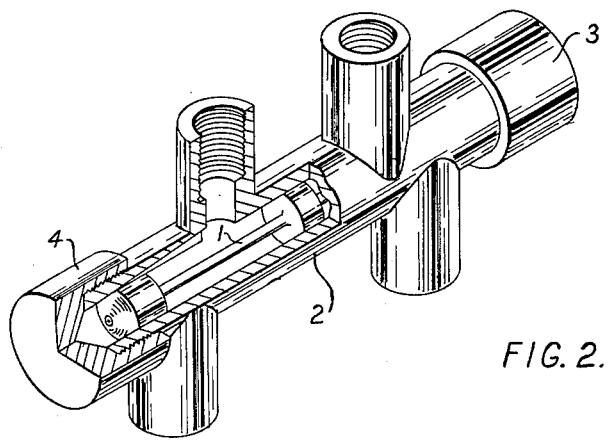
FIGURE 2 is a perspective view of the assembly containing a fragmentary sectional view embodying the principles of this invention.

The automatic pressure equalizing assembly as shown in FIGURE 2 consists essentially of a body 2 which has a cylindrical chamber and two inlet and two outlet ports, a single rod 1 with three sections the ends of the rod and the mid-section functioning like pistons, and end cap 3 and end cap 4. For convenience the rod will be called a sectional piston. The end sections of this rod will be called end pistons and the mid-section a center piston.

Figure 3:
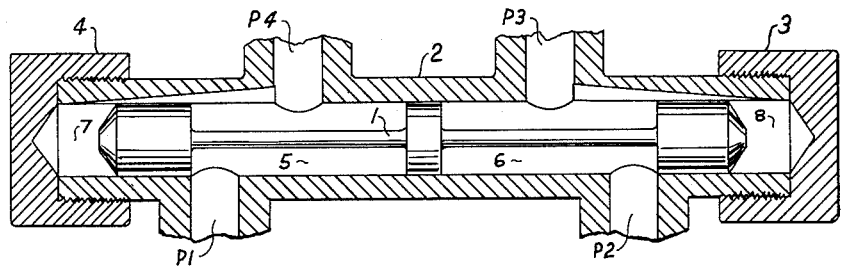

As shown in FIGURE 3 the sectional piston 1 fits into the cylindrical chamber of the body 2 and moves laterally. Its diminsions are such that when it slides to one end of the cylindrical chamber one end piston completely obstructs an inlet. By moving the sectional piston to the opposite end the other end piston completely obstructs the other inlet. The dimensions are such that neither the end pistons or the center piston will obstruct the outlets. When the sectional piston is centered the end pistons will not obstruct the inlets or the outlets.

It is to be noted that when the sectional piston 1 is inside the cylindrical chamber there are four chamber sections. Chamber 5 is connected to chamber 7 by a tapered groove in the body running from the outer side of the outlet port P4 almost to the end of the cylindrical chamber. Likewise chamber 6 is connected to chamber 8 by a similar groove.

In FIGURE 9 there is illustrated the embodied self-cleaning portion of the assembly, wherein the end pistons are tapered almost to a point and at each tip a small hole runs down to approximately the center. Another hole from the other side runs down angularly to meet it. Initially these holes are filled with a sealing compound. The two end caps have holes that are terminated in a conical shaped end. The function of the self-cleaning operation will be described in the latter part of this disclosure.

Referring to FIGURES 3 to 8, inclusive, these figures show the various positions of the sectional piston and the control effected thereby.

Assume that the hot water valve is turned on first. As the hot water valve is opened there will be a loss of pressure in chamber 5 due to the outflow of water through the outlet port P4 by way of inlet port P1. The full pressure in chamber 6 forces the sectional piston 1 to move to the left. This will happen regardless of where the sectional piston was initially at rest. As the sectional piston moves to the left the water in chamber 7 escapes through the groove on the left side. The groove on the right side offers a similar passageway for water. As the sectional piston moves closer to the end cap 4 it slows down due to the tapering of the groove.

Figure 4:
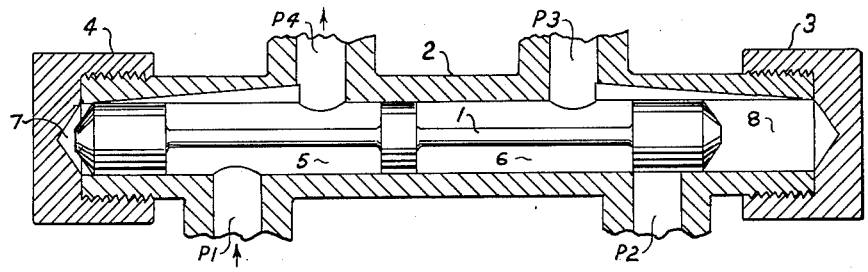

When the sectional piston reaches a point as illustrated in FIGURE 4 it stops due to the ending of the tapered groove. The water that is trapped in chamber 7 acts as a cushion so as to prevent shock and noise.

Figure 5:
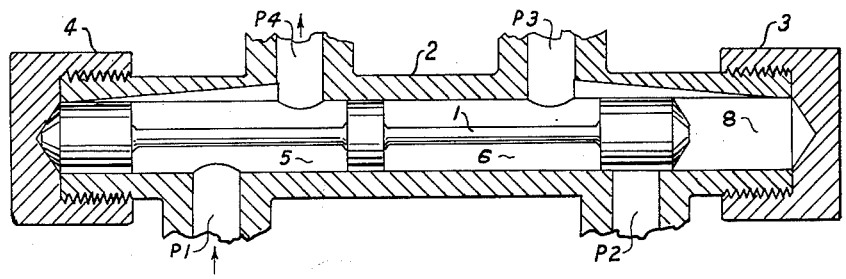

The sectional piston slowly moves against the end cap 4 as shown in FIGURE 5 due to the sectional piston not being completely water tight inside the cylindrical chamber. It should be noted at this time that the hot water inlet or outlet ports were not obstructed, therefore under this condition, of having one valve opened, the flow rate depends only on the hot water valve orifice.

Figure 6:
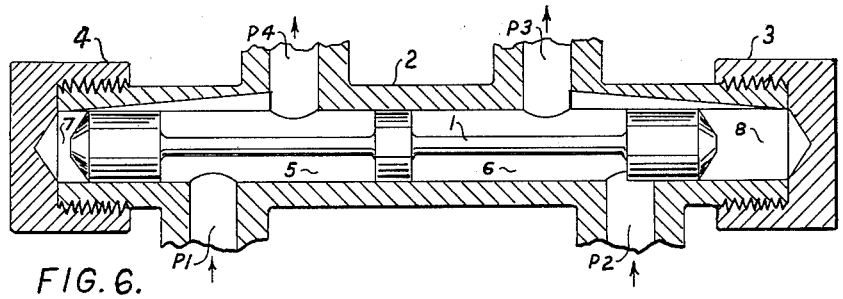

When the cold water valve is opened there is a loss of pressure in chamber 6 due to an outflow of water through outlet port P3. As the cold water valve is further opened the sectional piston moves to the right and allows cold water to flow into inlet port P2 through chamber 6 and out of outlet port P3. The valves are then adjusted until the desired temperature and flow rate are set. The position of the sectional piston at this time is shown in FIGURE 6. A similar condition would result if the cold water valve was first opened. No particular sequence of opening the valves need be followed, because it would always result in an equal pressure in chamber 5 and chamber 6.

It should be particularly noted that when water in both lines are flowing, regardless of their ratio, there is an equal pressure in chamber 5 and chamber 6. Therefore, the initial setting of the valves need not be changed regardless of the pressure conditions on the upstream side of either lines at the time when the valves are set.

The using of hot water or cold water or both simultaneously at other outlets causes a pressure change in both lines. These changes are felt in chamber 5 and chamber 6. The center piston acts to compare the pressure in chamber 5 and chamber 6, and as a result the sectional piston moves to equalize the pressure in these chambers by varying the orifice at the input ports.

Figure 7:
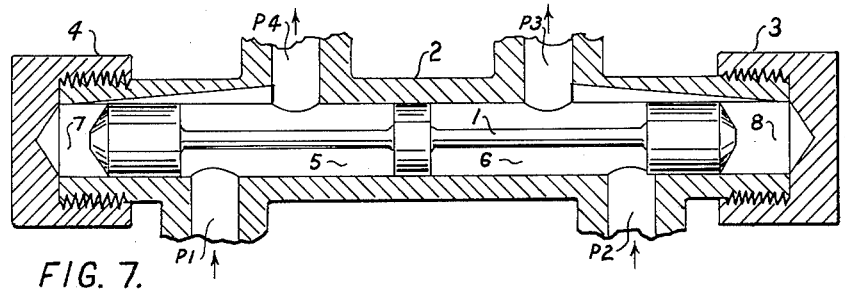

FIGURE 7 illustrates the new position of the sectional piston as it reacts to a small pressure drop in the cold water line.

Figure 8:
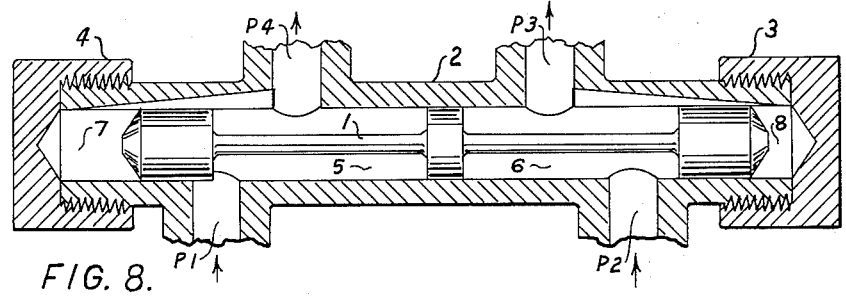

FIGURE 8 illustrates the new position of the sectional piston as it reacts to a large pressure drop in the cold water line. A similar reaction would occur if there was a pressure gain in the lines.

The self-cleaning section as illustrated in FIGURE 9 shows the sectional piston 1 pushed against the end cap 4. Usually the sequence in which the shower is turned on and off results in the sectional piston moving against one end cap as in the former case and then against the opposite end cap as in the latter case.

When the end piston is against the stopper a small cavity is formed due to the slightly flat tip on the end of the end piston. This serves as an accumulation catch. The tip of the end piston has a high pressure when it is against the end cap due to the small surface area of the tip. It serves to pulverize and squeeze the collected accumulations into the hole. Over a long period of use the accumulation gradually replaces the sealing compound and itself becomes the sealer. The accumulations are gradually washed off of the other end of the end piston as it becomes exposed to the current.

The hot and cold water lines have equal pressure when the outlets along the water line are not being used since they have the same common pressure source, hence there will be an extremely minute amount of water transferred across the center piston.

The placement of the tapered groove is vertically above the inlets. Should there be any air in the lines and if it happens to get into the end chambers, the placement of the groove allows the air to escape first as the sectional piston slides towards the end cap. It is obvious that the groove can be changed without departing from the spirit and scope of the invention.

The invention is claimed as follows:

An automatic fluid pressure equalizing assembly comprising a single body, said body having a cylindrical chamber open at opposite ends, said body including two inlet ports and two outlet ports, said ports interconnected by said cylindrical chamber, means for varying the input ports wherein said last named means comprises an unattached three sectional piston placed within said cylindrical chamber thereby creating four chamber sections, said chamber sections including two fixed volume chamber sections and two variable volume chamber sections, said variable volume chamber sections connected to adjacent fixed volume chamber sections by a tapered groove in said body, means for sealing the ends of said cylindrical chamber, and means for preventing clogging in internal parts wherein said last named means includes the three sectional piston having the ends of the end pistons tapered almost to a point with a passage from their tips to the opposite side of said end pistons, said passage being initially sealed with a sealing compound, said means for sealing the ends of said cylindrical chamber comprises two end caps having holes that terminate in a conical shaped end.

References Cited in the file of this patent
UNITED STATES PATENTS

| | | |
|---|---|---|
| 2,788,015 | Scherer | Apr. 9, 1957 |
| 2,882,869 | Krapf | Apr. 21, 1959 |
| 2,983,279 | Biermann | May 9, 1961 |